Patented Sept. 4, 1923.

1,467,081

UNITED STATES PATENT OFFICE.

EUGENE E. AYRES, JR., OF CHESTER, PENNSYLVANIA, ASSIGNOR TO THE SHARPLES SPECIALTY COMPANY, OF PHILADELPHIA, PENNSYLVANIA, A CORPORATION OF DELAWARE.

PROCESS FOR PRODUCING STABLE EMULSIONS OF EDIBLE OILS.

No Drawing. Application filed December 6, 1920. Serial No. 428,459.

*To all whom it may concern:*

Be it known that I, EUGENE E. AYRES, Jr., a citizen of the United States, residing at Chester, in the county of Delaware and State of Pennsylvania, have invented a new and useful Process for Producing Stable Emulsions of Edible Oils, of which the following is a specification.

My invention is a process for producing stable emulsions of edible oil of the type of water in oil (as distinguished from the type of oil in water) by the use of stearine as a stabilizing agent.

In various edible product industries, notably the margarine industry, it is desirable to emulsify aqueous liquids such as water, milk, whey and butter milk, with an edible oil, so that the resulting emulsions will not separate under the conditions existing in storage or ordinary use.

Efforts have been made to obtain the desired stability by the use of various types of machines and operations but the desired stable emulsions cannot be obtained thereby without the use of a suitable emulsifying agent. An electrical charge, as an emulsifying agent, has not been found sufficient in practice to stabilize an emulsion containing more than a very small percentage of suspended water and is unsatisfactory. Oil soluble colloids known to act as emulsifying agents are likely to make the oil emulsion inedible and their use is therefore generally prohibited.

I have found that it is possible to make highly concentrated emulsions of great stability by the use of a small percentage of the so-called "stearine" of commerce, such as cocoanut oil stearine or cotton seed oil stearine. The stearine is soluble in the oil to some extent but if present in sufficiently large percentages a portion thereof will precipitate as a colloid when the oil is cooled. The precipitated stearine acts as an insoluble colloid more easily wetted by oil than by water and therefore serves as a suitable agent for the production of a stable emulsion of water in oil. Moreover, cocoanut oil stearine is a natural constituent of cocoanut oil and cotton seed oil stearine is a natural constituent of cotton seed oil. Emulsions stabilized by these stearines are as edible as the emulsions containing no stearine. Stearine, such as that from animal fat, may be employed in place of those specified, and used in the same way with the production of the same results.

Among the desiderata of the process is that by its use of an insoluble colloid it is possible to produce my stable emulsions of water in oil when fresh milk is used for the water phase. Ordinarily, since milk contains a water soluble colloid which acts as an emulsifying agent, the natural emulsions of oil with milk tend to take the form of oil in water rather than water in oil. But in the present process it is possible to make stable emulsions of the type of water in oil, using fresh milk.

In the practice of the process, in the form of a concrete example, satisfactory results have been obtained by means of the following operations, namely, (1) warming cocoanut oil to about 120° F., (2) dissolving one per cent of cocoanut oil stearine in the cocoanut oil, (3) cooling the oil to the point where it becomes cloudy with precipitated stearine, and (4) passing the cloudy oil with water, milk or other aqueous liquid through an emulsifying machine, as a centrifugal.

It is important to dissolve the stearine in the oil at a temperature higher than the temperature at which it is desired to effect the emulsification, and it is also important to add enough of the stearine to cause precipitation when the oil is cooled down to the temperature of emulsification. The amount of stearine to be used for obtaining the desired results depends, in any specific case, upon the specific character of the oil, since some oils will naturally contain more stearine than others and some oils may have had the stearine removed as by chilling and pressing.

Having described my invention, I claim:

1. In the production of stable emulsions of edible oils, the combination of stearine with an edible oil and the emulsification of the product with an aqueous liquid adapted for forming an emulsion therewith.

2. In the production of stable emulsions of edible oils, the process which consists in saturating an edible oil with stearine at a temperature higher than that of the subsequent emulsification to be performed and effecting the emulsification of the product with an aqueous liquid adapted for forming an emulsion therewith.

3. In the production of stable emulsions of edible oils, the process which consists in warming an edible oil and dissolving stearine therein, cooling the oil with the stearine therein and precipitating a portion of the stearine, and emulsifying the product of the cooling operation with an aqueous liquid adapted for forming an emulsion therewith.

4. In the production of stable emulsions of edible oils, the process which consists in dissolving in an edible oil stearine in excess of its normal solubility therein, precipitating stearine previously dissolved in the oil, and emulsifying the product with an aqueous liquid adapted to form an emulsion therewith.

5. In the production of stable emulsions of edible oils, the combination of stearine with cocoanut oil and the emulsification of the product with an aqueous liquid adapted for forming an emulsion therewith.

In testimony whereof I have hereunto set my name this 4th day of December, 1920.

EUGENE E. AYRES, Jr.